Jan. 16, 1945.                P. J. GEBEL                 2,367,494
           APPARATUS FOR ADJUSTABLY HOLDING CUTTING
                TOOLS AGAINST GRINDING WHEELS
                  Filed April 20, 1943         2 Sheets-Sheet 1

PETER J. GEBEL.
INVENTOR.

By Allen & Allen
Attorneys

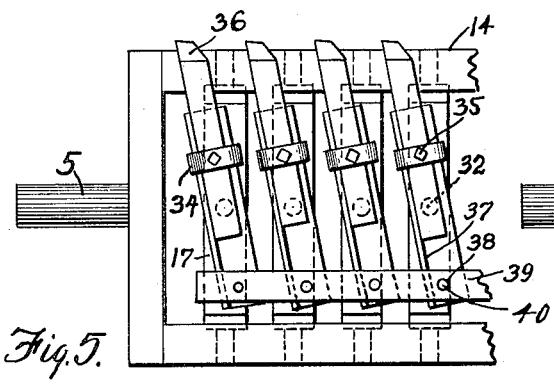
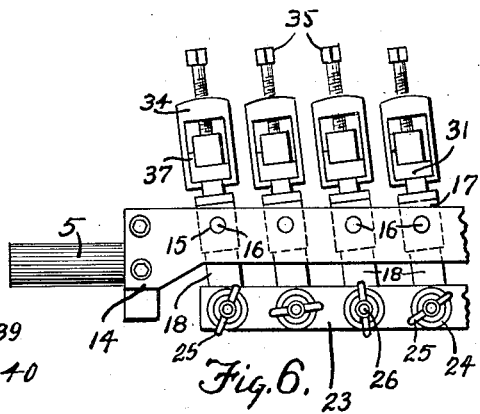
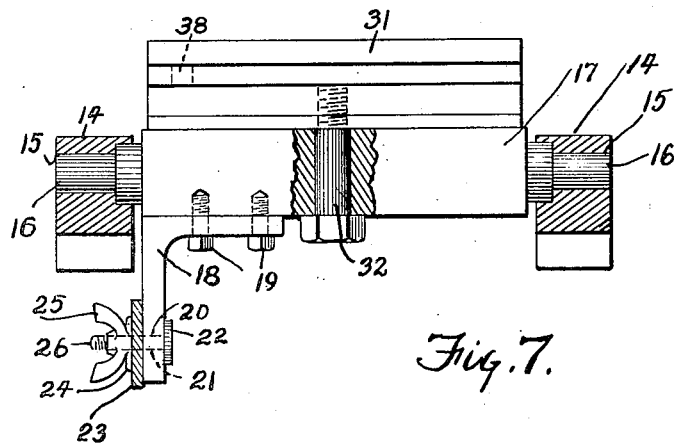

Patented Jan. 16, 1945

2,367,494

UNITED STATES PATENT OFFICE 2,367,494

APPARATUS FOR ADJUSTABLY HOLDING CUTTING TOOLS AGAINST GRINDING WHEELS

Peter J. Gebel, Cincinnati, Ohio

Application April 20, 1943, Serial No. 483,744

5 Claims. (Cl. 51—218)

My invention relates to improved apparatus for adjustably holding tools for presenting the tools for grinding against the working surface of a grinding wheel.

In machine tool work the precision of many machining operations is dependent on the accuracy with which the tool for such operations is ground. Where in large scale production the problem involves accuracy of cutting work on many different castings of the same parts where different machines perform substantially identical operations on identical castings, it becomes a matter of great importance that all the machine tools are provided with cutting tools ground substantially in an identical manner.

It has thus been the problem of the operator grinding the tools to attempt to grind each tool as closely as possible in a way similar to that in which other tools are ground.

Ordinarily the tool is positioned in a holder which is mounted on a support which is moved into engagement with the working surface of a grinding wheel. The various angular adjustments of the tool when presented to the working surface of the grinding wheel, can be determined quite accurately, but as far as I am aware, no one has previously proposed a machine which will hold a plurality of tools and present these tools properly positioned to the same grinding wheel so that each tool is ground in a substantially identical manner.

It is therefore the object of my invention to provide apparatus for a machine having a plurality of tool holders, each tool holder being adjustable with every other tool holder in the apparatus, so that the depth of cut, and the inclination of the cut with respect to the three possible planes of adjustment, may be accurately controlled.

In such a machine it is further my object to provide apparatus in which the tool holders for a plurality of tools may not only be adjusted to the same three possible planes of inclination, but so that the adjustability of the tool holders as a group, may be accomplished by group adjustment.

More specifically stating my objective, it is my purpose to provide apparatus wherein a plurality of tool holders may, by a single adjustment, be adjusted in a predetermined plane with respect to the horizontal by another adjustment in a predetermined plane with respect to the plane of the first adjustment, and by a third adjustment to a desired angle of inclination with respect to the plane of the first adjustment.

These broad objectives, and other specific objects to which reference will be made in the ensuring specification, I accomplish by that certain combination and arrangement of parts of which I have illustrated a preferred embodiment.

In the drawings:

Figure 5 is a top plan view of a portion of the assembly showing an adjustment of the tool holders in a plane at right angles to the plane of the frame.

Figure 6 is a detail side elevation showing the tool holders adjusted to a desired position of inclination, in the plane of the machine frame.

Figure 7 is an end elevation showing a preferred mounting for one of the tool holders.

Figure 1:
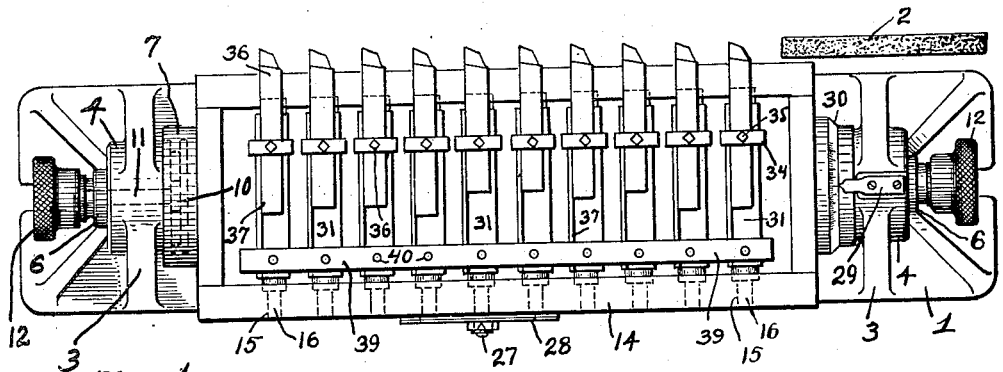
Figure 1 is a plan view of a preferred combination with a grinding wheel diagrammatically illustrated in association therewith.
Figure 2:
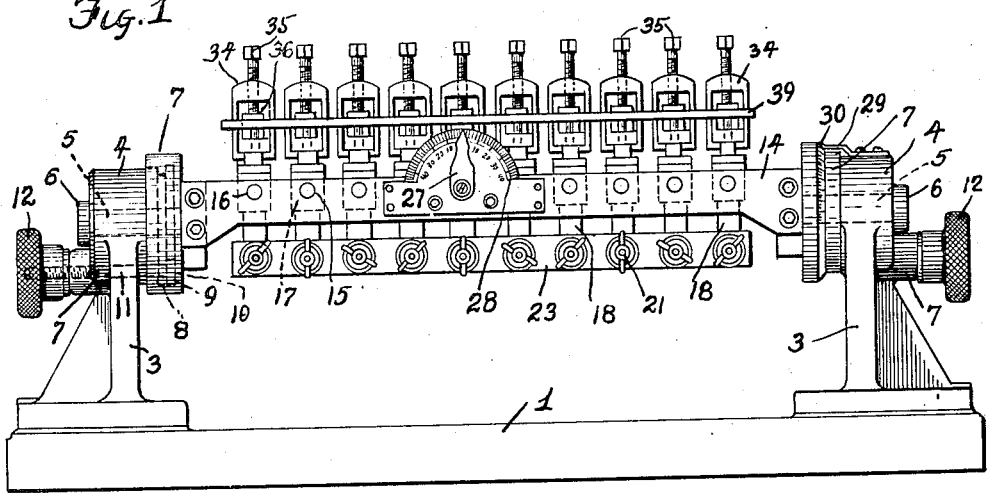
Figure 2 is a side elevation of the assembly shown in Figure 1.

Referring first to Figure 2, it will be observed that the machine is mounted on a base 1, on which the entire assembly may be moved relative to a grinding wheel, as diagrammatically shown at 2 in Figure 1. The machine has upright members 3, which have bosses 4 thereon which journal the shafts 5.

On the ends of the shaft 5, collars 6 are mounted. Also on the shaft 5 annular members 7 are fixedly mounted, which members are recessed annularly as shown at 8, the recess being cut out and enlarged as indicated at 9, so that a nut 10 is received within the channel of the member 7. The nut 10 is mounted on a threaded shaft 11, on which is a knurled hand wheel 12, which, when it is tightened down, pulls outwardly on the shaft 11, and so causes the nut 10 to point against the inner surface of the enlarged channel as indicated at 13. Such action firmly grasps and holds in position the annular member 7, which as has been stated, is fixed to the shaft 5.

This arrangement is merely for purposes of convenience in adjusting the angle to the horizontal of the frame 14.

The frame 14, which is a rigid member extending across between the bosses 4, may be moved to a desired position of inclination with respect to the horizontal, the pivot of the frame being on the axis of the shaft 5, which extends in a horizontal plane.

The angle of inclination of the frame 14 may be achieved in a similar manner with elimination of the parts 7 to 13, by merely mounting a nut replacing the collar 6. Thus by loosening the nuts the angle of inclination of the frame can be determined, and then the nuts tightened up to hold the frame in this position.

Referring now to Figure 7, the frame 14 has a series of round holes 15, which journal trunnions 16 of a series of blocks 17. There is one block for each tool holder. Each of the blocks 17 has an angled member 18 bolted to it as by bolts 19, and the extensions of the angled members which extend downwardly, have holes 20 which receive bolts 21 having enlarged heads 22, the fit of the bolts 21 into the holes 20 being a pressed fit, so that the bolts 21 are non-rotatable.

A plate 23 has a series of holes which register with the bolts 21 and washers 24 with wing nuts 25, are mounted on the threaded ends 26 of the bolts 21.

By loosening the wing nuts 25 on the series of bolts 21, the angles of inclination of the block 17 on axes corresponding to the axes of the trunnion 16, may be determined. Then when the wing nuts 25 are tightened, all the blocks are held in the adjusted position.

By providing one of the trunnions as indicated in Figure 2, with a fixed pointer 27, movable arcuately throughout the calibrated scale 28, the angle of inclination of all the blocks 17, may thus be accurately determined, and it will be noted that this angle of adjustment is accomplished by the movement of the bar 23 either to the left or right, as illustrated in Figure 2.

It may be stated that the angle of inclination of the frame 14 on its horizontal pivot (i. e. the axes of the shafts 5), may also be calibrated by means of a fixed pointer 29, over which the arcuate scale 30 on the member 7 may be moved. Each block has pivotally mounted thereon a tool holder 31, the preferred mounting being as illustrated in Figure 7, a bolt 32 which extends up into a threaded opening 33 in the block.

As shown in Figure 2, the tool holders have fixed strap members 34 extending up from the holders which receive threaded adjustment bolts 35, the purpose of which is to clamp down on a tool, as indicated at 36, and hold the tool in adjusted position. Ordinarily as indicated in Figure 1, the alignment of the tool with respect to the holder is by abutting the side edge of the tool against the edge of the holder, as indicated at 37 in Figure 1, then by tightening down on the bolts 35, each one of the tools will be clamped in the same relative position in its holders as every other tool in the other holders in the machine.

Each tool holder has a hole as illustrated at 38 in Figure 7, and a bar 39 has a series of spaced studs 40, which may be positioned within the holes 38 in the tool carriers.

By unscrewing the whole series of bolts 32, each tool holder will be free to pivot about the axis of its respective bolt when the bar 39 is moved either to the right or left as illustrated in Figure 5, thereby determining the angular position of inclination of each tool holder in the plane of the machine frame 14.

In Figure 5 for example, the bar 39 has been inserted with its pins 40 within the holes 38 of the tool holders and moved to the right. By comparing the position of the tool holders in Figure 5 with the position of the tool holders in Figure 1, this operation may be visualized. By the employment of a protractor, the angular position of the aligning bar 39 may be readily determined, and since the aligning bar 39 fixes the angular adjustment of all the tool holders on the axes of the bolts 32, the calibration of all the tool holders is accomplished at the same time by the movement of the aligning bar 39. In order to explain the adjustability of the machine, let us assume that we are preparing to mount ten tools so as to present the cutting edges of each in exacly the same position relative to the grinding wheel indicated at 2.

Figures 3, 4:
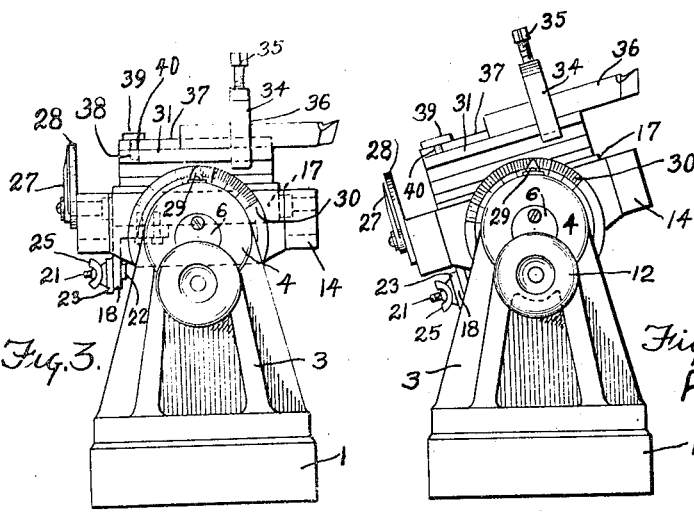
Figure 3 is an end elevation of the apparatus.
Figure 4 is an end elevation of the apparatus showing the frame of the machine adjusted to a desired angular position with respect to the horizontal.

Referring first to Figures 3 and 4, the angle of inclination of the frame of the machine to the horizontal is first determined. Then each tool is placed in its respective holder, its left side edge as indicated in Figure 1, being in abutment with the wall 37 of its respective tool holder. The bolts 35 are then turned down so as to hold each tool in its respective holder.

The bolts 32 are then loosened and the angle of the tool holders each on its respective block, is then determined by means of the aligning bar 40. The final adjustment is then fixed by releasing the wing nuts 25 and adjusting the alignment of the blocks 17. The wing nuts 25 are then tightened and the entire machine is ready for presentation to the working surface of the grinding wheel wherein it will be noted that each tool will be ground in an exactly similar manner.

The positioning of the plurality of tools mounted in the tool holder with respect to the axis on which the grinding wheel is rotating, is of course, the important phase of my invention. It is obvious that the adjustment of the machine frame determines the inclination of the tools in a plane extending vertically from the axis on which the grinding wheel is rotating. Of course, if the grinding wheel does not rotate on a horizontal axis, as illustrated, the plane in which the inclination of the machine frame is adjusted, is at a 90 degree angle to the axis of the grinding wheel.

The degree of twist of the tools on axes parallel with the axis of the grinding wheel is determined by the adjustment on the aligning bar and the angle of inclination of the tools determined by the adjustment of the wing nuts, determines the angular position of the tools in a plane extending horizontally from the axis of the grinding wheel.

It will also be apparent that by the various adjustments to the three possible variables in position of the tools, I have provided universal adjustability.

Modification in the arrangement shown by which the various adjustments may be accomplished by mechanically equivalent means, I include within the scope of the claims which follow.

Having thus described my invention, what I claim as new and desire to secure by Letters Patent is:

1. A machine for holding a plurality of similarly shaped metal pieces, each of which is to be presented to a rotating shape forming tool for shaping similarly contoured portions on each metal piece, comprising a horizontally pivoted rectangular shaped frame, the frame being rigid and extending substantially lengthwise across the machine, individual supports for metal piece holders one for each holder, said supports pivoted on axes extending in the plane of said frame and at right angles to the length of said frame, one for each metal piece holder, metal piece holders pivotally mounted in said supports on axes extending substantially upright at right angles to the axes of said supports, and means operatively connected with each of said supports for conjointly adjusting the angular position of said supports about their pivotal axes.

2. A machine for holding a plurality of similarly shaped metal pieces, each of which is to be presented to a rotating shape forming tool for shaping similarly contoured portions on each metal piece, comprising a horizontally pivoted rectangular shaped frame, the frame being rigid and extending substantially lengthwise across the machine, individual supports for metal piece holders one for each holder, said supports pivoted on axes extending in the plane of said frame and at right angles to the length of said frame, one for each metal piece holder, metal piece holders pivotally mounted in said supports on axes extending substantially upright at right angles to the axes of said supports, and means adapted to be operatively connected with each of said metal piece holders for conjointly adjusting the angular position of said holders about their pivotal axes.

3. A machine for holding a plurality of similarly shaped metal pieces, each of which is to be presented to a rotating shape forming tool for shaping similarly contoured portions on each metal piece, comprising a horizontally pivoted rectangular shaped frame, the frame being rigid and extending substantially lengthwise across the machine, individual supports for metal piece holders one for each holder, said supports pivoted on axes extending in the plane of said frame at right angles to the length of said frame, one for each metal piece holder, metal piece holders pivotally mounted in said supports on axes extending substantially upright at right angles to the axes of said supports, means operatively connected with each of said supports for conjointly adjusting the angular position of said supports about their pivotal axes, and means adapted to be operatively connected with each of said metal piece holders for conjointly adjusting the angular position of said holders about their pivotal axes.

4. A machine for holding a plurality of similarly shaped metal pieces, each of which is to be presented to a rotating shape forming tool for shaping similarly contoured portions on each metal piece, comprising a horizontally pivoted rectangular shaped frame, the frame being rigid and extending substantially lengthwise across the machine, individual supports for metal piece holders one for each holder, said supports pivoted on axes extending in the plane of said frame at right angles to the length of said frame, one for each metal piece holder, metal piece holders pivotally mounted in said supports on axes extending substantially upright at right angles to the axes of said supports, and means operatively connected with each of said supports for conjointly adjusting the angular position of said supports about their pivotal axes, said means being spaced from the axes of said supports.

5. A machine for holding a plurality of similarly shaped metal pieces, each of which is to be presented to a rotating shape forming tool for shaping similarly contoured portions on each metal piece, comprising a horizontally pivoted rectangular shaped frame, the frame being rigid and extending substantially lengthwise across the machine, individual supports for metal piece holders one for each holder, said supports pivoted on axes extending in the plane of said frame at right angles to the length of said frame, one for each metal piece holder, metal piece holders pivotally mounted in said supports on axes extending substantially upright at right angles to the axes of said supports, and means adapted to be operatively connected with each of said metal piece holders for conjointly adjusting the angular position of said holders about their pivotal axes, said means being spaced from the axes of said holders.

PETER J. GEBEL.